3,377,331
PRODUCTION OF POLYMERS
Robert J. McManimie, Dayton, Ohio, assignor to Monsanto Company, a corporation of Delaware
No Drawing. Filed Aug. 31, 1955, Ser. No. 534,375
20 Claims. (Cl. 260—94.9)

This invention relates to the production and working up of Ziegler-type polymers. In preferred aspects the invention pertains to methods of minimizing color formation which tends to occur on thermal processing of Ziegler-type polymers, especially polymers of ethylenically unsaturated hydrocarbons such as polyethylene, polypropylene, polystyrene, polydiolefins and the like, prepared by the action of Ziegler-type catalysts, by virtue of improvements in the steps of recovering polymer from the polymerization reaction mixture. In other aspects the invention provides improved polyethylene obtained by polymerizing ethylene in the presence of a catalyst exemplified by the material obtained by the interaction of a trialkylaluminum with titanium tetrachloride.

There has recently come into commercial prominence the polymerization of ethylene and other monomers through the agency of a type of catalyst advanced by Prof. Dr. Karl Ziegler of the Max Planck Institute at Mulheim (Ruhr), Germany. Probably the preferred group of these catalysts is that disclosed in Belgian Patent No. 533,362, issued May 16, 1955 to Ziegler, the disclosure of which is hereby incorporated herein by reference, namely catalysts prepared by the interaction of a trialkylaluminum with a compound of a metal of Group IV–B, V–B or VI–B of the Periodic System, including thorium and uranium, and especially compounds of titanium, zirconium and chromium. These, and the variety of other catalysts of the Ziegler type as will be discussed hereinafter, can be considered exemplified by the catalyst obtained by the interaction of a trialkylaluminum with titanium tetrachloride, and as a matter of convenience and by way of example, the invention will be described with particular reference to polyethylene produced by the action of a catalyst obtained by the interaction of a trialkylaluminum with titanium tetrachloride.

Heretofore, the art has been taught that once the polymerization has been completed the polymer should either be separated from the usually employed liquid reaction medium as by filtration and then subjected to one of several treatments for the removal of catalyst residues, preferred treatment being the use of an alcohol at temperatures below about 70° C., or alternatively to introduce such an alcohol into the total reaction mixture and then separate the polymer by filtration or otherwise from the alcohol plus liquid reaction medium and then continue treatment with alcohol or other treating agent to remove catalyst residues. It may be pointed out that usually the polymer when recovered by any of these procedures has a white appearance, and accordingly, little attention has been paid to any effects this portion of the treatment may have on polymer quality. However, once the polymers are subjected to the conventional thermal processing, such as milling or otherwise working at elevated temperatures and molding, extruding, and the like, an appreciable amount of color develops. Even the best of the previous known Ziegler-type polymers leave much to be desired in the way of color after they have been subjected to thermal processing.

In accordance with the present invention, I am able to produce Ziegler polymers of decreased susceptibility to color formation on thermal processing, by treating the freshly prepared polymer while still containing some catalyst residue with an alcohol at a temperature above 90° C. while completely excluding molecular oxygen from contact with the polymer at all times prior thereto.

I have found that, while treating with an alcohol at higher temperatures such as above 90° C. gives a product superior, with respect to color formation, to that obtained by treating at lower temperatures, this is insufficient to give a polymer which is sufficiently resistant to the development of color to meet commercial standards for most end uses of the polymer. I have also found that complete exclusion of contact with molecular oxygen prior to contacting the polymer with an alcohol at lower temperatures such as below about 70° C., is insufficient to produce polymer of the quality just mentioned. I have also found that, even when treating with an alcohol at a temperature above 90° C., only a very slight contact with molecular oxygen, usually in the form of air, is sufficient to make a radical difference in the color-forming properties of the polymer. Thus, the objects of the invention cannot be attained even by such a procedure as filtering the total polymer slurry (obtained at the end of the reaction) in air but under conditions where all the polymer particles still remain wetted with the liquid reaction medium, e.g., kerosene, and then promptly treating same with an alcohol at a temperature above 90° C. While it would not appear that such a procedure could permit appreciable action of air upon the polymer or catalyst residues therein, I have found that apparently such an action does take place to a very marked extent—at least, regardless of any theory of just what action between the air and polymer or catalyst may be involved, undesirable effects are obtained and I am able to avoid such undesirable effects only by vigorous and complete exclusion of all molecular oxygen from contact with any portion of the polymer until it has been treated with an alcohol at a temperature above 90° C. for a time sufficient to effect significant removal of catalyst.

In the preferred practice of my invention, complete exclusion of molecular oxygen is obtained by blanketing the polymer at all stages with an inert gas. This provides a positive exclusion of air and its content of oxygen as well as carbon dioxide, water vapor and other such materials naturally or fortuitously present in air and which I also desire to exclude completely. The polymerization reaction will be completed either by exhaustion of the catalyst to the point where the polymerization has completely stopped or at least slowed down to an undesired extent, or by using all of the monomer to form polymer, or in a case where monomers are being introduced over a period of time either intermittently or continuously (which is the case usually with the more highly reactive monomers such as ethylene) at any time selected by the operator such as the point at which the polymer content of reactor reaches a point beyond which it is inconvenient to operate so that the operator stops introducing additional monomer. Regardless of the reasons for the polymerization completely stopping of its own accord or being considered stopped by having progressed as far as desired, it is preferred that at such time (if not sooner) the inert blanketing gas be introduced into the reactor. In the case of a gaseous monomer such as ethylene, for example, any excess ethylene can be blown down from the reactor if it is being operated under pressure and then the inert blanketing gas introduced, or the introduction of ethylene may merely be stopped and inert blanketing gas introduced, usually by passing through the reaction mass and the reactor sufficient quantities of the inert gas to sweep out any unreacted ethylene. It may be pointed out that in the case of the higher boiling monomers, particularly those that are normally liquid at ordinary room temperatures, such as 20° C., the entire polymerization may have been carried out under a blanket of inert gas which, therefore, is present at the end of the polymerization period. It is generally very desirable to set up the polymerization apparatus, even when ethylene is being polymerized, in such a way that a supply of inert gas is available for maintaining the pressure in the reactor or at least at atmospheric pressure and preferably a slight amount higher than atmospheric pressure, for example one pound per square inch gauge or higher. This avoids the introduction of any air to the polymerizing system. In the case of gaseous monomers, such as ethylene, propylene, butadiene, etc., an accidental stoppage of the flow of the monomer into the polymerization system would, in the absence of such arrangement, permit the pressure to drop below atmospheric by using up monomer in the polymerization vessel without adding the usual supply to keep the pressure at or above atmospheric pressure. Any arrangement for automatically supplying inert gas under such circumstances can be used; for example a slow flow of an inert gas into and through the reactor can be effected, with the exit having a considerable volume and being bubbled through any chosen height of a liquid, for example, mercury, before being vented to the atmosphere. Any means directly responsive to the pressure in the reactor can also be used to supply inert gas in any desired quantity as may be needed. In any event, in accordance with the preferred practice of this invention, the total polymerization reaction mixture is blanketed with inert gas as soon as, if not before, the polymerization period has ended.

The inert gas will usually, as a matter of economy and convenience, be such a material as nitrogen or methane. The source of such gas, or the treatment thereof prior to its use, has to be such as to insure the absence from the gas of any molecular oxygen, and preferably also the absence or at least a low content of various catalyst poisons such as acetylenic compounds, e.g., acetylene or vinyl acetylene, carbon dioxide, carbon monoxide, water vapor, aldehydes, hydrogen sulfide, mercaptans, carbonyl sulfide, and the like. Various other inert gases will be well understood by those skilled in the art, but there may be also mentioned by way of example hydrogen, the noble gases such as argon and helium, propane, normal butane, isobutane. It may be pointed out that a gaseous monomer such as ethylene or propylene, can itself be considered an inert gas once the catalytic activity has been destroyed, as by introducing an alcohol into the reaction mixture.

Once having established the blanket of gas over the total reaction mixture, it is within the broad scope of my invention to introduce the chosen alcohol directly into the total reaction mixture, including any inert liquid diluent or solvent that may have been employed. This can be done at ordinary temperatures, such as those below about 70° C. as previously taught in this art, or the reaction mixture and alcohol can be at such temperatures that the resulting admixture is at a temperature above 90° C. If the former, the temperature may then be brought up to above 90° C., either promptly or after allowing a period of time such as 30 minutes to one hour at the lower temperature. Of course it is always desirable to insure thorough admixture of added alcohol, no matter what the temperature, with polymer, for example by providing adequate stirring, shaking or the like.

In the preferred practice of the invention, I separate the polymer from at least the bulk of any inert liquid diluent that was used during the polymerization, before treating with alcohol at a temperature above 90° C., all the while, of course, completely excluding molecular oxygen, preferably by means of a blanket of an inert gas. It will be seen that the separation of polymer from inert liquid diluent or solvent can be accomplished whether or not there has been added an alcohol at a temperature below 70° C. In any event the polymer is separated from liquids—whether the liquid is only the inert diluent used during the polymerization or also includes alcohol which has been added at ordinary temperatures for the purpose of providing an initial "quench" of the catalyst, i.e., stopping catalytic activity and which will also provide some catalyst removal—by well-known means such as filtering or centrifuging, the while excluding molecular oxygen as by providing a blanket of inert gas. The separation of polymer from the liquid solvent or diluent need not be complete, but it may be pointed out that the more thoroughly the separation is accomplished, the less separation must ultimately be effected between recovered alcohol and diluent used during the polymerization. To this end, it is quite permissible and may sometimes be advantageous to effect as thorough of separation of polymer from the diluent as possible, and then to wash the polymer one or more times with an alcohol, in which case economic considerations will dictate whether the resulting admixture of alcohol and small amounts of diluent are to be subjected to separation and recovery means or merely discarded.

In accordance with this preferred embodiment of my invention, wherein the polymer is separated from at least the bulk of the liquid diluent while under the protection of an inert gas blanket, the next step after such separation is the treatment of the polymer with an alcohol at a temperature above 90° C., the inert gas blanket still being maintained. The chosen quantity of alcohol is admixed thoroughly with the polymer, and the admixture is maintained at a temperature above 90° C., preferably from 100 to 115° C., for a time sufficient to effect significant removal of catalyst. It is a great advantage of my invention that this time is exceedingly short. Thus, even a one minute contact time between alcohol and polymer at a temperature above 90° C. provided molecular oxygen has been excluded at all times prior thereto, is sufficient to effect significant removal of catalyst, while in many instances five minutes is fully adequate to effect maximum catalyst removal as reflected in color and other properties of the final polymer after being subjected to thermal processing. The maximum, or at least the optimum, time for this contacting step will naturally vary considerably, depending on the particular alcohol used, the particular polymer and even upon the characteristics such as molecular weight of the various polymers made from a single monomer, the presence or absence of liquid diluent or solvent, the proportion of alcohol to polymer, the temperature, and the extent of intermixture which will be dependent upon several variables, especially agitation. The softening point of the polymer is of some interest here, and with those polymers which are solid at temperatures above 90° C. it is preferred to avoid increasing the temperature to such an extent that a softening of the polymer takes place with resultant aggregation and sometimes sticking to the treating equipment. For example, with high molecular weight Ziegler polyethylene, temperatures up to 115° C. are quite adequate while higher temperatures tend to cause a certain amount of agglomeration of the type stated. Here again, however, several variables will affect the results, and particularly the higher the molecular weight of the alcohol the more readily such softening and agglomeration will occur. Also, as the molecular weight of the polymer is decreased, softening and agglomeration will occur more readily. Some methods of polymerization give polymers which are not finely divided. To solubilize the catalyst residues in these materials, solution of the polymer in hot organic diluent-alcohol mixture, for example a toluene/isobutyl alcohol mixture, may be necessary. The polymer can then be reprecipitated by several methods such as cooling, addition of a non-solvent, e.g., hexane, or evaporation of the diluent. The higher molecular weight alcohols tend to dissolve polymers at elevated temperatures, and it is permissible to so dissolve the polymer in alcohol and then separate by addition of a non-solvent, cooling, or otherwise as just mentioned.

The complete exclusion of molecular oxygen by blanketing with an inert gas having been accomplished at least until the polymer has been treated with an alcohol at a temperature above 90° C., it is preferred to continue this use of the inert gas blanket throughout the period of the alcohol treatment. While it is not outside of the broad scope of the invention to admit molecular oxygen as soon as the alcohol and polymer have contacted each other at a temperature above 90° C., there would seldom be any practical advantage and it is much preferred to avoid this until the end of the period chosen for effecting this treatment. After the treatment of polymer with alcohol at a temperature above 90° C. has been effected to the desired extent, the polymer is separated from the alcohol, as well as from any inert diluent that may be present, by any of the well-known means such as by filtering or centrifuging by the same general procedures described above. Here again, I prefer to maintain a blanket of inert gas during this separation treatment. The polymer is washed on the filter or centrifuge with additional fresh alcohol, or with an inert, preferably low-boiling, solvent such as hexane, to remove any of the alcohol which has been used in the treatment and which is adhering to the polymer. In the more stubborn cases, the treatment of the polymer with alcohol at temperatures above 90° C. can be repeated one or more times. It is not essential to continue the protection from molecular oxygen during such treatment, but it is very much preferred to do so, again preferably by means of a blanket of inert gas.

Once the treatment or treatments with alcohol have been completed, residual alcohol is removed from polymer by conventional means, such as by merely allowing same to stand exposed to the atmosphere for a sufficient time to permit the alcohol to evaporate, but preferably by mild heating under vacuum, such as heating at 60 to 80° C. in a vacuum oven for a period of one to two hours. It is well to avoid exposure of the polymer to air when it is being dried, especially at elevated temperatures. The polymer is now ready to be employed in any manner. The usual commercial procedure is to subject it to extrusion, for example by extruding at a temperature of 180° C. in the case of polyethylene in the form of a continuous cylinder having a diameter of one-eighth to one-quarter inch, and chopping same into particles, say one-quarter inch long so as to form a molding powder which can be easily handled. This molding powder can then be milled or otherwise mixed, with or without stabilizers, other polymers, plasticizers, fillers, dyes, pigments, vulcanizing agents and the like, and formed by extrusion, injection or compression molding or other means into films, fibers, monofilaments, sheets or objects of various shapes as may be desired in the case of solid polymers employed in the plastics industry, or used as such or compounded with various other materials in the case of semi-solid or liquid polymers for use as adhesives, coating materials and the like in accordance with the properties of the particular polymer.

It is preferred to protect the polymers from various deteriorative influences, especialy the influence of thermal processing, either in the presence or absence of air. An effective procedure is to mix with the polymer a material which stabilizes polyvinyl chloride against heat deterioration, as disclosed and claimed in the copending application of Ival O. Salyer and Allen S. Kenyon, Ser. No. 532,365, filed Sept. 2, 1955. Alternatively or preferably additionally, any of the materials known as rubber antioxidants can be incorporated with the polymer. Preferably, such polyvinyl chloride stabilizer, rubber antioxidant, or other material added to protect the polymer from any deteriorating influence, is added prior to any substantial thermal precessing of the same, i.e., before the polymer is subjected to shear at elevated temperatures. Thus, the dried polymer can be admixed with the protectant prior to any milling, mixing, extruding or other operation, or the protectant or protectants can even be present in the alcohol employed in treating the polymer in accordance with the present invention.

Any alcohol can be used for the purpose of this invention. Naturally those which at atmospheric pressure are liquid at the temperature of treatment are most convenient. Alkyl alcohols containing from 1 to 8 carbon atoms are particularly desirable, and alkyl alcohols containing from 3 to 8 carbon atoms are particularly preferred since little or no pressure is required to maintain then in the preferred liquid phase. Alcohols that can be used include, by way of example, methyl alcohol, ethyl alcohol, n-propyl alcohol, isopropyl alcohol, n-butyl alcohol, isobutyl alcohol, tertiary butyl alcohol, secondary butyl alcohol, any of the amyl alcohols many of which are commercially available either as single alcohols or mixed alcohols, the various hexyl, heptyl, octyl and higher alcohols, and particularly n-heptyl alcohol, n-octyl alcohol, isooctyl alcohol, 2-ethylhexyl alcohol, higher alcohols such as dodecyl alcohol, and even higher such as octadecyl alcohol, cetyl alcohol, etc., alcohols of the type obtained by reaction of olefins with carbon monoxide and hydrogen in accordance with the "Oxo" process and several of which are commercially available, cycohexanol, 2-ethylcyclopentanol, cyclohexyl carbinol, phenylcyclohexanol, ethylene glycol, triethylene glycol, the various "Cellosolves" and "Carbitols," propylene glycol, glycerine, benzyl alcohol, methyl phenyl carbinol. While all of the alcohols so far mentioned are free from aliphatic unsaturation, alcohols containing same, for example cyclohexenol allyl carbinol, etc., can be used although there would seldom be any advantage. While the unsubstituted alcohols are particularly useful, the alcohols can, if desired, be substituted with one or more substituents, which do not interfere with the treatment, for example halo-, keto-, ether-radicals. The various phenols, for example phenol, cresol, $\beta$-naphthol, resorcinol, can also be used.

While the amount of alcohol to be used is subject to wide variation, it is necessary in order to obtain thorough inter-mixture to use a considerable excess over that theoretically required to react with any catalyst residue in the polymer. Thus, from about 2 to about 200 moles of the alcohol per mole of catalyst present in the polymer can be used. It is generally preferred to use a weight of alcohol which is several times the weight of the polymer being treated. Sufficient alcohol to form a readily stirrable slurry is desirable.

Alcohol employed for the purpose of the present invention can be reused one or more times prior to purification, or can without any reuse be purified, by any suitable means such as distillation, filtration through activated charcoal, or treatment with ions exchange resins. It is preferred that the alcohols employed in the present invention have a low water content, and preferably anhydrous alcohols are used. If desired, the alcohols can be dried by distillation, and/or by chemical treatment such as by distillation over calcium hydride, treatment with alkali metal or alkali metal hydrides or other drying agents. It is preferred that the water content of the alcohol, as determined by the Karl Fischer method, be below 0.1 weight percent, and preferably below 0.05 or even below 0.01 percent. In general, the higher the water content of the alcohol, the more color is found in the polymer after thermal processing.

Further information will now be presented on the various polymers to which the present invention is applicable, and suitable catalysts and procedures for preparing same. As pointed out above, an important group of Ziegler catalysts is disclosed in Belgian Patent 533,362, namely catalysts prepared by the interaction of a trialkylaluminum with a compound of a metal of Group IV–B, V–B or VI–B in the Periodic System.

Other catalysts of the Ziegler type differ from those disclosed in the above-mentioned Belgian Patent 533,362, in various ways, for example as follows: Instead of or in addition to the aluminum trialkyls, catalysts of the type described in the Belgian patent can be made by reacting the various metal compounds of Groups IV–B, V–B and VI–B disclosed therein with aluminum compounds of the general formula RAlX₂, where R is hydrogen or hydrocarbon, X means any other substituent including hydrogen or hydrocarbon, particularly dialkyl or diaryl aluminum monohalides, also aluminum hydride, alkyl or aryl aluminum dihydrides, dialkyl or diaryl aluminum hydrides, alkyl or aryl aluminum dihalides, alkyl or aryl aluminum dialkoxy or diaryloxy compounds, dialkyl or diaryl aluminum alkoxy or aryloxy compounds. Similarly, instead of or in addition to the organoaluminum compounds, organic compounds of magnesium or zinc can be used, and these can contain either a single or two hydrocarbon radicals, those of especial interest being Grignard compounds, magnesium dialkyls, mixed organo zinc compounds such as $C_2H_5ZnI$ and zinc dialkyls, all of these of course being reacted with compounds of Groups IV–B, V–B or VI–B metals. Another Ziegler type catalyst is prepared by the interaction of an aluminum compound of the general formula $R_2AlX$ where R is a hydrocarbon radical such as alkyl or aryl, and X is a halogen, such as chlorine or bromine, with a compound of a metal of Group VIII of the Periodic System, e.g., iron, nickel, cobalt, or platinum, or manganese, for example dimethylaluminum monobromide plus ferric chloride, diisobutylaluminum chloride plus nickel (trivalent) chloride, diethylaluminum monochloride plus manganic chloride. Yet another combination is that of the Group IV–B, V–B or VI–B metal compounds with aluminum compounds of the general formula $R_2AlX$, where R is hydrogen or a hydrocarbon radical and X is the radical of a secondary amine, a secondary acid amide, a mercaptan, a thiophenol, a carboxylic acid, or a sulfonic acid, eg., piperidyl diethylaluminum plus $TiCl_4$, dimethylaminodiethylaluminum plus zirconium titrachloride, ethylmercaptodiethylaluminum plus $TiCl_4$. Another of the classes of Ziegler type polymerization catalysts comprises compounds of the Group IV–B, V–B or VI–B heavy metals as previously mentioned, combined with the alkali metal alkyls, for example with lithium-, sodium-, or potassium-methyl, -ethyl, -benzyl, -isobutyl, or with complex compounds of such alkali metal alkyls with organic compounds of aluminum, magnesium or zinc as mentioned above, or complex compounds of alkali metal hydrides with such organic compounds or aluminum, magnesium or zinc, for example butyl lithium plus zirconium tetrachloride, sodium tetramethylaluminum plus titanium tetrachloride or plus thorium acetylacetonate. Other Ziegler-type catalysts are prepared by using (in conjunction with compounds of Group IV–B, V–B and VI–B metals), instead of trialkylaluminums, triaryl-, triarylalkyl-, trialkaryl- or mixed alkyl- and aryl-aluminum, zinc, magnesium or alkali metals, e.g., phenyl sodium plus $TiCl_4$.

Those skilled in the polymerization art having knowledge of these matters, refer to catalysts of the foregoing type as Ziegler or Ziegler-type polymerization catalysts, and to polymers prepared by their action as Ziegler or Ziegler-type polymers, the terms "Ziegler" and "Ziegler-type" being used synonymously. While the pricipal classes of such catalysts have been listed, this listing is not to be construed as complete, and various other such catalysts than those set forth may also be used to produce polymers which are treated in accordance with the invention of the present application. Thus, ethylene and other monomers can be polymerized by catalysts obtained by treating compounds of heavy metals, especially compounds of the Group IV–B, V–B and VI–B metals, not with organometallic compounds but rather by reducing agents such as: alkali metals, e.g., lithium, sodium, potassium; alkali hydrides, e.g., lithium hydride, sodium hydride; complex alkali aluminum and alkali boron hydrides, e.g., lithium aluminum hydride; complexes of alkali metal hydrides with boron triaryls or boric acid esters or boronic acid esters; and especially titanium and zirconium halides reduced by zinc or alkaline earth metals or other earth metals including the rare earths, or hydrides of same; said reductions being effected in the complete absence of oxygen, moisture and compounds containing active hydrogen atoms as determined by the Zerewitinoff method. Polymers of low to medium molecular weight can be obtained from ethylene and other monomers by using trialkylaluminums alone as catalysts, especially in very small amounts, as well as dialkyl berylliums, trialkyl galliums, trialkyl indiums, monoalkylaluminumdihydrides, and the various other catalysts disclosed by Ziegler in U.S. Patent No. 2,699,457. Attention is further directed to the teaching of various of the foregoing catalysts in Zeigler's Belgian Patents 534,792 and 534,888, the disclosures of which are hereby incorporated herein by reference. The essence of the present invention, however, is not to be found in the particular Ziegler type polymerization catalyst employed in making the polymers in question, but rather in treating such polymers while still containing some catalyst residue with an alcohol at a temperature above 90° C. while completely excluding molecular oxygen from contact with the polymer at all times prior thereto.

The present invention is broadly applicable to all Ziegler type polymers, i.e., all polymers prepared by polymerizing a monomer or mixture of monomers in the presence of a Ziegler type catalyst. Of especial interest, of course, are those Ziegler solid polymers of sufficiently high molecular weight to be useful in the plastics industry, but some of the benefits of the invention are obtainable with lower molecular weight Ziegler semi-solid and even liquid polymers which can be used, for example, in adhesives, as lube oil additives, etc. The preferred polymers have a molecular weight of at least 2,000 and preferably 10,000. Those Ziegler polymers to which the present invention is applied with particular advantage generally have much higher molecular weights ranging from 20,000 to 50,000 or 100,000, and even in many cases as high as 1,000,000 to 3,000,000 or more. The molecular weights in question are those calculated in the conventional manner on the basis of the viscosity of the polymer in solution as described in the Journal für Praktische Chemie, 2nd Series, vol. 158, page 136 (1941), and J.A.C.S. 73, page 1901 (1951).

At the present time, ethylene is by far the preferred monomer for preparing Ziegler polymers. The ethylene can be homopolymerized, or can be copolymerized with varying amounts, particularly on the order of from 2 to 10 percent, of higher olefins such as propylene or butylene, especially the former. The ethylene can also be copolymerized with butadiene and/or isoprene as disclosed in the copending application of Carroll A. Hochwalt, Ser. No. 502,008, filed Apr. 18, 1955. Also of interest are the copolymers of butadiene or isoprene with styrene, disclosed in the copending application of Carroll A. Hochwalt, Ser. No. 501,795, filed Apr. 18, 1955. Homopolymers of butadiene and of isoprene as prepared by the use of Ziegler type catalysts are also of great interest, having exceptional low temperature properties, as disclosed in the copending application of Robert J. Slocombe, Ser. No. 502,189, filed Apr. 18, 1955. Other ethylenically unsaturated hydrocarbons whose Ziegler polymers are of potential interest include propylene, butylenes, especially butene-1, amylenes and the like. Substituted olefins are also of interest, such as vinylcyclohexene, styrene, etc. Styrene when polymerized in the presence of Ziegler-type catalysts gives a high molecular weight polymer showing a crystalline structure by X-ray diffraction examination. Ziegler-type polyvinyl ethers, especially the homopolymers of alkyl vinyl ethers, e.g., ethyl vinyl ether, 2-ethylhexyl vinyl ether, etc. and copolymers of same with ethylene and other copolymerizable ethylenically unsaturated comonomers, as disclosed in the copending application of Earl W. Gluesenkamp, Ser. No. 507,717, filed May 11, 1955, can also be treated in accordance with the present invention. A variety of copolymers of the various monomers named above with each other and with other comonomers can be prepared by Ziegler catalysis, and the present invention in its broadest scope includes all such and in fact all polymers prepared through the agency of Ziegler type catalysts on any single monomer or mixture of monomers polymerizable with such catalysts. Despite the broad scope of the invention, it will be found more convenient in most of the present application to discuss the invention with specific reference to preferred embodiments thereof, and accordingly, Ziegler type polyethylene is especially referred to by way of example.

More detailed information will now be given on preferred process conditions and catalysts for preparing various Ziegler polymers. I prefer to polymerize the chosen monomer in the presence of a catalyst prepared by the interaction of (a) an aluminum compound of the general formula $R_2AlX$ wherein R is an alkyl, cycloalkyl or aryl radical and X is hydrogen, halogen or an alkyl, cycloalkyl or aryl radical, with (b) a metal halide selected from the group consisting of the chlorides, bromides and iodides of titanium and zirconium. The preparation of polymers will be described, by way of example, with particular reference to catalysts prepared by the interaction of trialkylaluminums, e.g., triethylaluminum, triisobutylaluminum, trioctylaluminum, with titanium tetrachloride.

Suitable aluminum compounds to be reacted with the chlorides, bromides or iodides of titanium or zirconium are those represented by the general formula $R_2AlX$ wherein R is an alkyl, cycloalkyl or aryl radical and X is hydrogen, halogen or an alkyl, cycloalkyl or aryl radical. By way of example, but not limitation, the following compounds are mentioned:

Triethylaluminum
Triisobutylaluminum
Trioctylaluminum
Didodecyloctylaluminum
Diisobutylaluminum hydride
Tridodecylaluminum
Diphenylaluminum bromide
Dipropylcyclohexylaluminum
Ditolylmethylaluminum
Tri(β-phenylethyl)aluminum
Diethylaluminum chloride
Diisobutylaluminum chloride
Diisobutylaluminum iodide
Di(β-cyclohexylpropyl)isobutylaluminum It is to be understood that mixtures of the foregoing types of aluminum compounds can be employed. One can use the total reaction mixtures obtained in the formation of such compounds, e.g., by treatment of metallic aluminum with alkyl halides resulting in the formation of such mixtures as $R_2AlCl$ plus $RAlCl_2$, termed alkylaluminum sesquihalides.

The aluminum compounds in question are interacted with one or more chlorides, bromides or iodides of titanium or zirconium, the chlorides and iodides being preferred. The titanium or zirconium in these halides should be in a valence form higher than the lowest possible valence. The tetrahalides are especially preferred, although the dihalides, trihalides, mixtures of di-, tri- and tetrahalides, etc. can be used. Preferred titanium or zirconium compounds are those that are soluble in an organic solvent (preferably a hydrocarbon such as hexane, benzene kerosene, etc.) that is used in preparing the catalyst. Titanium or zirconium compounds other than the named halides, e.g., those called alcoholates, alkoxides or esters by various investigators such as titanium tetramethoxide (also called tetramethyl titanate), titanium triethoxide, tripropoxytitanium chloride, zirconium tetran-butoxide, or fluorides of titanium or zirconium, or complexes such as zirconium acetylacetonate, $K_2TiF_6$, or salts of organic acids such as the acetates, benzoates, etc., of titanium and zirconium, can be used to prepare catalysts with at least some activity and to that extent can be considered equivalents of the halides; however, such compounds are usually prepared from the halides and hence are more costly, and also are usually less active, so their use is economically sound only where in a particular situation favorable effects can be obtained such as increased solubility in an organic solvent that is used in preparing the catalyst, or polymer of increased molecular weight, or faster reaction rate. Although the exact action resulting from contacting the aluminum compound with the titanium or zirconium compound is not understood, it is believed likely that the zirconium or titanium halide is reduced in valence by the reaction of the added aluminum compound. The mole ratio of aluminum compound to titanium (or zirconium) compound, or stated another and simpler way, the mole ratio of aluminum to titanium (or zirconium), can vary over a wide range, suitable values being from 0.3:1 to 10:1 on up to 15:1 or higher. It is generally preferred to use an Al:Ti mole ratio between 1:3 and 5:1. The same ratios apply in the case of the zirconium compounds. While active catalysts can be prepared by a variety of procedures, the simplest and perhaps most effective is to add the titanium or zirconium halide to the aluminum compound, preferably in the presence of an inert organic solvent. Such solvents can suitably be saturated aliphatic and alicyclic, and aromatic, hydrocarbons, halogenated hydrocarbons, and saturated ethers. The hydrocarbon solvents are generally preferred. By way of example can be mentioned liquefied propane, isobutane, normal butane, n-hexane, the various isomeric hexanes, cyclohexane, methylcyclopentane, dimethylcyclohexane, dodecane, industrial solvents composed of saturated and/or aromatic hydrocarbons, such as kerosenes, naphthas, etc., especially when hydrogenated to remove any olefin compounds and other impurities, and especially those ranging in boiling point up to 600° F. Also, benzene, toluene, ethylbenzene, cumene, decalin, ethylene dichloride, chlorobenzene, diethyl ether, o-dichlorobenzene, dibutyl ether, tetrahydrofuran, dioxane.

It may also be mentioned here that the polymerization can readily be effected in the presence of any of the classes of solvents and specific solvents just named. If the proportion of such solvent is kept low in the reaction mixture, such as from 0 to 0.5 part by weight inert organic solvent (i.e., inert to the reactants and catalysts under the conditions employed) per 1 part by weight total polymer produced, solvent recovery steps are obviated or minimized with consequent advantage. It is often helpful in obtaining efficient contact between monomers and catalyst and in aiding removal of heat of reaction, to employ larger amounts of solvent, for example from 5 to 30 parts by weight solvent per 1 part by weight total polymer produced; this also tends to give polymer in fine powder form, which is thus more available to the action of the alcohol in the catalyst removal treatment. These inert solvents, which are solvents for the monomers, some of the catalyst components, and some of the polymers, but are non-solvents for many of the polymers, e.g., polyethylene, can properly be termed inert liquid diluents.

The amount of catalyst required is dependent on the other variables of the polymerization reaction, and although amounts as small as 0.01 weight percent based on total weight of monomers charged are sometimes permissible, it is usually desirable to use somewhat larger amounts, such as from 0.1 up to 2 to 5 percent or even considerably higher, say up to 20 percent, depending upon the monomer or monomers, the presence or absence of solvent, the temperatures, pressures, and other reaction conditions. When polymerization is effected in the presence of a solvent, the catalyst to solvent weight ratio should be at least about 0.003:1.

The polymerization can be effected over a wide range of temperatures, again the particular preferred temperature being chosen in accordance with the monomer, pressure, particular catalyst and other reaction variables. For many monomers from room temperature down to say minus 40° C. and even lower are suitable, and in many cases it is preferred that the temperature be maintained at below about 35° C. However, for other monomers, particularly ethylene, higher temperatures appear to be optimum, say from 50 to 75° C. for ethylene. Temperatures ranging up to 100° C. and higher are generally satisfactory for Ziegler type polymerization.

The pressure at which the polymerization is carried out is dependent upon the chosen monomer or monomers, as well as other variables. In most instances, the polymerization is suitably carried out at atmospheric pressure or higher. Although subatmospheric pressures are permissible, there would seldom be any advantage. Pressures ranging from atmospheric up to several hundred or even many thousand pounds per square inch, e.g., 50,000 p.s.i. and higher, are suitable. While high pressures are not required in order to obtain the reaction, they will have a desirable effect on reaction rate and in some instances on polymer quality. The choice of whether or not to use an appreciably elevated pressure will be one of economic and practical considerations taking into account the advantages that can be obtained thereby.

The catalyst is sensitive to various poisons, among which may be mentioned oxygen, water, carbon dioxide, carbon monoxide, acetylenic compounds such as acetylene, vinylacetylene, alcohols, esters, ketones, aldehydes, and the like. For this reason, suitable precautions should be taken to protect the catalyst and the reaction mixture from such materials. An excess of the aluminum compound, particularly mole ratios of aluminum to titanium or zirconium in excess of about 4:1, tends to give a certain amount of protection against these poisons. The monomers and diluents or solvents, if used, need not be pure so long as they are reasonably free from poisons. However, best results are ordinarily obtained if the monomer feed contains at least 90 weight percent and preferably higher of the polymerizable monomer, exclusive of any solvent material, and much less than 1 weight percent total catalyst poisons.

The monomer or mixture of monomers is contacted with the catalyst in any convenient manner, preferably by bringing the catalyst and monomer together with intimate agitation provided by suitable stirring or other means. The agitation can be continued during the polymerization, or in some instances the polymerization mixture can be allowed to remain quiescent while the polymerization takes place. In the case of the more rapid reactions with the more active catalysts, means can be provided for refluxing monomer and solvent if any of the latter is present, and thus remove the heat of reaction. In any event adequate means should be provided for dissipating the exothermic heat of polymerization. If desired, the monomer can be brought in vapor phase into contact with the solid catalyst, in the presence or absence of liquid solvent. The polymerization can be effected in the batch manner, or in a continuous manner, such as for example, by passing the reaction mixture through an elongated reaction tube which is contacted externally with suitable cooling medium to maintain desired reaction temperature.

As a matter of general information, the following description is offered of some of the properties of various Ziegler polymers.

The Ziegler type catalysts can be employed to polymerize styrene and vinyl aromatic hydrocarbons, generally, i.e., hydrocarbons containing a $CH_2=CH-$ group directly attached to an aromatic ring, e.g., vinyltoluene, vinylnaphthalene, vinylxylene, vinyl methylnaphthaline, vinylisopropylbenzene and the like. See the copending application of Roland J. Kern, Ser. No. 498,254, filed Mar. 31, 1955. There are produced polyvinyl aromatic hydrocarbons, e.g., polystyrene, having a crystalline nature as determined by X-ray diffraction analysis, as well as a lower molecular weight amorphous acetone soluble material. The crystalline polystyrene is highly resistant to the action of heat and the action of solvents. These properties adapt it particularly for injection and compression molded articles, and for extrusion and other methods of forming into films, fibers, tubes and other shapes. It can of course be formulated with various pigments, dyes, fillers, other polymers and the like as may be desirable to impart particular desired characteristics. It can be drawn out into fibers where the crystallinity has a desirable strengthening effect. Likewise, films can be oriented by unidirectional or bidirectional stretching thereby obtaining greatly increased strength. In all such processing, in view of the high softening and melting points of the polystyrene, it will be seen that the treatment provided by the present invention is of particular value and importance.

Application of the Ziegler type catalysts to the homopolymerization of butadiene, homopolymerization of isoprene, and the copolymerization of butadiene with isoprene in all proportions, is taught in the copending application of Robert J. Slocombe, Ser. No. 502,189, filed Apr. 18, 1955. These diolefin polymers are vulcanizable elastomeric materials having outstanding low temperature properties. For example, butadiene polymerized by the action of a catalyst prepared from triethylaluminum plus titanium tetrachloride, when subjected to the Clash-Berg test (essentially that described in Ind. Eng. Chem. 34, 1218 (1942)), had a rubber temperature ($T_{2000}$) of minus 12° C. and an extrapolated brittle temperature ($T_f$) of minus 167° C.; its second order transition temperature (approximated by $T_f$) is much lower than conventional polybutadiene, yet the polymer is much stiffer at ordinary atmospheric temperatures, the resultant very broad transition range being of much importance in practical applications of the rubber.

Butadiene or isoprene can be copolymerized with vinyl aromatic hydrocarbons, such as styrene or any of the vinyl aromatic hydrocarbons mentioned above, in the presence of Ziegler type catalysts, as disclosed in the copending application of Carroll A. Hochwalt, Ser. No. 501,795, filed Apr. 18, 1955. These copolymers cover the entire range of proportions of the diolefin on the one hand with the vinyl aromatic hydrocarbon on the other hand, but those containing a major weight proportion of diolefin and a minor weight proportion of vinyl aromatic hydrocarbon are preferred. The preferred copolymers are vulcanizable elastomeric materials, which are flexible at much lower temperatures than synthetic rubbers prepared from the same monomers under conventional conditions, yet are stiffer than said conventional rubbers at temperatures ranging from somewhat below room temperature and above. A copolymer of butadiene and styrene prepared by the action of a catalyst obtained by reacting triethylaluminum with $TiCl_4$, when subjected to the Clash-Berg test, had an extrapolated $T_f$ of minus 83° C., and $T_{2000}$ of plus 9° C.

Ethylene can be copolymerized with butadiene or isoprene or mixtures of same, in the presence of Ziegler type catalysts, as disclosed in the copending application of Carroll A. Hochwalt, Ser. No. 502,008, filed Apr. 18, 1955. Such copolymers can be made having a major weight proportion of ethylene and a minor weight proportion of the diolefin, or a major weight proportion of diolefin and a minor weight proportion of ethylene, the variations in monomer proportions in the polymer covering the entire range from a very small proportion of ethylene to a very small proportion of diolefin in the copolymer. These copolymers are vulcanizable. Those containing a major proportion of diolefin are elastomeric materials, while those containing largely ethylene with a minor weight proportion of diolefin resemble ethylene homopolymer prepared by Ziegler catalysis but have improved low temperature properties. Thus, a copolymer of ethylene with butadiene containing combined in the polymer molecule a preponderance of ethylene, was prepared by the action of a catalyst obtained by reacting triethylaluminum with TiCl$_4$, and when subjected to the Clash-Berg test had a T$_f$ of minus 60° C. and a T$_{2000}$ of plus 80° C. The Stifflex range was thus 140° C., as opposed to approximately 115° C. for a typical commercial polyethylene prepared by conventional oxygen-catalyzed high pressure polymerization.

Vinyl ethers can be homopolymerized or copolymerized with other monomers, especially ethylenically unsaturated hydrocarbon comonomers, in the presence of Ziegler-type catalysts, as disclosed in copending application of Earl W. Gluesenkamp, Ser. No. 507,717, filed May 11, 1955. A great variety of products can be made, depending on the particular vinyl ethers chosen, any comonomers chosen, reaction conditions, and particular Ziegler-type catalysts. Of special interest are tacky polymers obtained by the homo- or copolymerization of alkyl vinyl ethers, which find use in the field of adhesives. A copolymer containing a major weight proportion of ethylene and a minor proportion of vinyl ether can be prepared which has the general physical characteristics of polyethylene, but is somewhat softer and more adhesive and thus of special use in the interlayer of laminated safety glass, and as a readily printable film. Thus, a homopolymer of ethyl vinyl ether prepared by the action of a catalyst obtained by reacting triethylaluminum with TiCl$_4$ was a sticky, resinous material suitable for use as an adhesive. Copolymers of ethylene with various vinyl ethers, such as ethyl vinyl ether and 2-ethylhexyl vinyl ether were obtained by action of the same catalyst, the copolymer of ethylene with ethyl vinyl ether containing 28 weight percent ethyl vinyl ether, having by the Clash-Berg test a T$_f$ of minus 20° C. and a T$_{2000}$ of plus 114° C. and being useful as interlayer in glass laminates.

Ethylene is readily homopolymerized, or copolymerized, for example with small amounts of propylene or butylene, in the presence of Ziegler-type catalysts, to give a polyethylene of higher density, usually 0.94 and above, greater crystallinity, and much higher softening point, than polyethylene obtained by conventional high pressure oxygen-catalyzed polymerization. Great variation in molecular weight can be obtained with consequent variation in properties, the most important molecular weight ranges being from 50,000 up to 1,000,000 and higher.

The foregoing information has been given by way of example of various Ziegler-type polymers. These and other Ziegler polymers are effectively treated in accordance with the present invention.

It will be understood of course that the various Ziegler type polymers have a great variety of uses depending upon their particular properties and that in applying the polymers to such uses they can have added thereto a great variety of fillers, dyes, pigments, reinforcing agents, other polymers, plasticizers, softeners, tackifiers, and the like.

In order to illustrate some of the various aspects of the invention, and serve as a guide in applying the invention, the following specific examples are given. It will of course be understood that variations from the particular catalysts, monomers, solvents, alcohols, times, proportions, and the like can be made without departing from the invention.

Example 1

Catalyst was prepared by dissolving triisobutyl-aluminum in purified kerosene and slowly adding thereto, while stirring, titanium tetrachloride in such amount that the final catalyst mixture had a mole ratio of aluminum to titanium of 0.5:1.

The resulting catalyst slurry in the amount of 100 ml. was placed in 1150 ml. purified kerosense, giving a concentration of total catalyst components (excluding kerosene) of 0.4 gram per 100 ml. total kerosene. This introduction of catalyst slurry into the large volume of kerosene was done in a 2-liter jacketed glass resin pot equipped with a paddle-type stirrer and a gas inlet extending below the liquid level. Manifolded to this gas inlet was a supply of pure ethylene, and also a supply of lamp grade nitrogen (extremely pure nitrogen which is oxygen-free and which is used for filling incandescent lamp bulbs). The arrangement was such that there was at all times a slow flow of nitrogen provided through the reaction system, exiting through a tube providing a slight positive pressure in the reaction pot and of sufficient length that should a pressure less than atmospheric develop therein only nitrogen, and not air, would be drawn back into the system.

After bringing the contents of the reactor to a temperature of 60.5° C. ethylene flow was started and maintained at a rate of 140 grams per hour for a period of one hour. The temperature rose immediately on starting the ethylene flow, and was levelled out at 69±3° C. during the rest of the polymerization. Insoluble polyethylene was formed, suspended as fine particles in the liquid. At the end of one hour, ethylene flow was stopped and nitrogen was passed through the system for 5 minutes.

The resulting slurry of polyethylene, catalyst and kerosene (it was necessary to add 250 ml. more kerosene to dilute the polymer slurry) was then forced by nitrogen pressure into a nitrogen-flushed 1-liter capacity pressure filter equipped with stirrer, addition funnel, reflux condenser, inlet for the polymer slurry, heating mantle and a sintered glass filter disc in the bottom. The outlet of this vessel below the filter disc could be closed by a glass stopcock. The slurry was filter by applying suction to the outlet beyond the sintered filter disc, a positive pressure of nitrogen being maintained on the polymer at all times. To resulting moist filter cake there was added 400 ml. boiling isobutanol. This was reheated to reflux temperature (107° C.) and maintained under reflux for 5 minutes, with stirring, and was then filtered. It may be mentioned here that the color of the total reaction mixture prior to introduction into the filter vessel was dark brown. On filtration of the butanol slurry, by the same procedure described above, the color appeared to be essentially all in the isobutanol filtrate, but without a device to press the cake the isobutanol and color could not be removed completely in one wash. While still maintaining complete protection from air by the maintenance of a positive pressure of lamp grade nitrogen, the polymer was rinsed three times with 500 ml. portions of hexane at reflux. All operations from start of the polymerization to the end of the last hexane rinse were conducted under lamp grade nitrogen. The thus-treated and washed polymer was then removed from the pressure filter vessel and air-dried, i.e., allowed to stand in air overnight at room temperature.

The thus-dried polymer was a very white powder. It was milled on a conventional rubber mill roll for 5 minutes at a roll surface temperature of 170° C., 50 parts per million Santowhite® crystals, i.e., 4,4'-thiobis(6-tert-butyl-m-cresol), being introduced into the polymer in the early stages of the milling. It was then compression molded at 170° C. for 3 to 5 minutes into a slab 0.06–0.07 inch thick.

An arbitrary color standard had been set up, with values ranging from 1 to 10 in increasing order of darkness. Value 1 was the color of the best commercially available polyethylene, made by conventional high pressure oxygen-catalyzed polymerization of ethylene. The higher numbers on this color scale all had a brown tinge, ranging from very light tan for color No. 2 on through varying shades of darkness through 10 which is a very dark brown. This color scale also provides for applying the letter "G" after the color number for a sample which has a grayish cast.

The polymer prepared, washed, milled and molded as described above, rated 1 on this color scale. It had an excellent white appearance, and although it was not clear but rather milky it was translucent to such an extent that a slab 0.06–0.07 inch thick when placed against printing or writing easily permitted reading of same through the polymer sample.

As a matter of interest, the following data were also obtained on this polymer sample.

| | |
|---|---|
| Density (g./cc.) | .9359 |
| Tensile strength (p.s.i.), yield break | 3182/4325 |
| Tensile elongation (percent), yield break | 10/673 |
| Melt index (dg./min.) | 0.24 |
| Memory (percent) | 11 |

Example 2

Ethylene was polymerized in the same apparatus described in Example 1 and by following the same procedures. A different batch of catalyst, but prepared the same way and with the same quantities of materials, was used, and the same quantities of catalyst and of kerosene were used. The reaction system was protected with lamp grade nitrogen as described in Example 1. Ethylene was passed into the reaction mixture over a period of 75 minutes at a rate of 140 grams per hour at a temperature of 68±1° C. At the completion of the reaction period, ethylene flow was stopped, the reactor was flushed with nitrogen, and the total reaction mixture, which was a slurry of polymer, catalyst and kerosene, was quickly poured out and filtered in a laboratory Buchner funnel in a flask to which the suction of a water aspirator was applied. As soon as the slurry had been transferred to the filter, the polymer on the filter was covered with a sheet of rubber, held on the funnel by a rubber band, so that exposure to air was quite small.

Samples of the polymer were taken from the filter cake at varying periods of time. The "exposure time" was the time from the opening of the reactor to the time at which the particular sample removed from the filter cake was placed under isobutanol. Samples were taken at exposure times of 4 minutes, 8 minutes, 17 minutes, 34 minutes, 420 minutes and 1055 minutes. During the first 8 minutes, exposure to air was as little as possible. Thereafter, the filter cake was exposed freely to the air, with occasional stirring. Each sample, which was placed in 1000 ml. of isobutanol at the end of its stated exposure time, was allowed to stand in the isobutanol and then the samples were heated to reflux and refluxed for 5 minutes. The hot isobutanol-polymer slurry was then filtered, the polymer placed in 500 ml. hexane, brought to reflux and again filtered. The polymer was then air dried as in Example 1.

The resulting series of samples was then milled and molded in the same way and under the same conditions described in Example 1. Color ratings on the same arbitrary color scale were as follows.

| Length of air exposure (min) | Color rating |
|---|---|
| 4 | 5 |
| 8 | 7 |
| 17 | 8 |
| 34 | 7 |
| 420 | 8 |
| 1055 | 8 |

The foregoing data demonstrate the adverse effect of even slight exposure of the polymer to air prior to treatment with refluxing isobutanol. It should be mentioned that the polymer after washing and drying had the same general white powdery appearance as that of Example 1, and that the color only developed on the milling and molding.

As a matter of interest, the following data were also obtained on these polymer samples:

| | Length of Air Exposure (min.) | | | | | |
|---|---|---|---|---|---|---|
| | 4 | 8 | 17 | 34 | 420 | 1,055 |
| Density (g./cc.) | 0.9404 | 0.9409 | 0.9425 | 0.9444 | 0.9441 | 0.9462 |
| Tensile Strength (p.s.i.): | | | | | | |
| Yield | 3,100 | 3,150 | 2,930 | 3,125 | 3,145 | 3,295 |
| Break | 4,270 | 4,695 | 4,625 | 5,260 | 4,610 | 5,135 |
| Tensile Elongation (Percent): | | | | | | |
| Yield | 15 | 15 | 15 | 15 | 15 | 15 |
| Break | 725 | 730 | 725 | 750 | 720 | 755 |
| Melt Index (dg./min.) | 0.048 | 0.021 | 0.010 | 0.020 | 0.015 | 0.012 |
| Memory (Percent) | 0 | 0 | 0 | 0 | 0 | 0 |
| Chlorine (wt. percent) | 0.03 | 0.05 | 0.07 | 0.10 | 0.11 | 0.11 |

These test data show that, regardless of the length of exposure to air, in general the polymer had about the same physical characteristics with the exception of color and density. It is interesting to note that the greater the exposure to air, the more dense the polymer became. The significance of this is not clear, but it shows a definite change in this characteristic of the polymer, paralleling the increasing color of the milled and molded polymer.

Example 3

Ethylene was polymerized in the same polymerization equipment and by the same procedures described in Examples 1 and 2. The catalyst was separately prepared, employing the same amounts of triisobutylaluminum and $TiCl_4$, and using the same amount of catalyst and kerosene in the reactor.

Ethylene was passed in at a rate of 140 grams per hour for a total time of 75 minutes, the temperature being maintained at 70° C. At the end of this time, ethylene flow was stopped, the reactor was flushed with nitrogen, and there was introduced into the reaction pot 400 ml. of isobutanol, a blanket of lamp grade nitrogen being maintained in the reaction pot. The resulting slurry of polymer, catalyst components, kerosene and isobutanol was stirred at 60° C. for one hour, and then filtered by the same procedure described in Example 2. The filtering was handled as in Example 2, as was the sampling of the filter cake at varying exposure times. The placing of the samples, taken at the various exposure times, in isobutanol, their refluxing with isobutanol, filtering, washing with hexane, and air drying were as described in Example 2.

The following data were obtained:

| | Exposure Time (min.) | | | | | |
|---|---|---|---|---|---|---|
| | 3 | 7 | 15 | 28 | 213 | 457 |
| Color | 1G | 2 | 2 | 2 | 4G | 4G |
| Density (g./cc.) | .9396 | .9357 | .9383 | .9399 | .9393 | .9403 |
| Chlorine (wt. percent) | 0.02 | 0.01 | 0.01 | 0.01 | 0.02 | 0.02 |

It is seen that the colors of these polymer samples were all much better than the colors of the corresponding samples of Example 2, and in fact the poorest of these samples was slightly better in color than the best of the Example 2 samples. This may be due to destruction of the bulk of the catalyst material by the first addition of isobutanol to the total reaction mixture at about the reaction temperature, prior to the contact with air and final refluxing with isobuantol. However, it will be seen, in progressively comparing colors of the samples ranging from maximum air exposure to minimum air exposure, that once air exposure had been dropped to about 30 minutes, no further improvement in color was obtained until the exposure time had been decreased to 3 minutes. This polymer with 3 minute exposure time was rated 1G, meaning that it had less brown tinge than the color scale 2 but had a grayish cast. The visual difference between the color of this polymer and the color of the polymer of Example 1, was marked, that of Example 1 being the better. Comparing them side by side, the 3 minute exposure polymer of this Example 3 still had a definite brown tinge not noted in the polymer of Example 1.

Example 4

Polyethylene was prepared in the same general way as described in the preceding examples, but on a larger, pilot plant scale. It was filtered out from the kerosene reaction medium with some, although slight, contact with air, and then washed for 2 hours at 90° C. in isobutanol. It was then filtered out from the isobutanol, and the isobutanol-wet filter cake separated into portions and placed in Soxhlet extraction vessels, the extraction portion of which were wound with electrical resistance elements so that the liquid therein was kept essentially at the boiling point. The polymer samples were then extracted with refluxing isobutanol for 2 hours, 4 hours and 18 hours. Color ratings of these materials, dried, milled and molded as described in Example 1, were:

| Extraction time, hrs.— | Color |
| --- | --- |
| 2 | 4G |
| 4 | 3G |
| 18 | 2G |

It will be seen that this air exposed polymer could be improved considerably in color by prolonged extraction with refluxing isobutanol. However, even 18 hours extraction gave a color rating of only 2G, which was only a moderate improvement over the 3G color obtained with 4 hours extraction.

While the invention has been described with particular reference to preferred embodiments, it will be appreciated that variations from the exact details given herein can be effected without departing from the invention in its broadest aspects.

I claim:

1. In a process for the production of polymer through the catalytic action of a Ziegler polymerization catalyst adapted for the low-pressure polymerization of ethylene, an ethylenically unsaturated hydrocarbon monomer polymerizable thereby, the method of minimizing color formation in the polymer on thermal processing thereof which comprises treating said polymer while still containing at least some catalyst residue with an alcohol at a temperature above 90° C. while completely excluding molecular oxygen from contact with the polymer at all times prior thereto.

2. Process of claim 1 wherein the polymer is polyethylene.

3. Process of claim 1 wherein the polymer is polypropylene.

4. Process of claim 1 wherein the polymer is polystyrene.

5. Process of claim 1 wherein the polymer is a diolefin polymer.

6. Process of claim 1 wherein the alcohol is an alkyl alcohol.

7. Process of claim 1 wherein the alcohol is an alkyl alcohol containing from 1 to 8 carbon atoms.

8. Process of claim 1 wherein the alcohol is isobutanol.

9. Process of claim 1 wherein said temperature is within the range of 100 to 125° C.

10. In a process for the production of polymer through the catalytic action of a Ziegler polymerization catalyst, adapted for the low-pressure polymerization of ethylene, on an ethylenically unsaturated hydrocarbon monomer polymerizable thereby, the method of minimizing color formation in the polymer on thermal processing thereof which comprises completely protecting the total polymerization reaction mixture from any contact with molecular oxygen by blanketing same with an inert gas, and while still completely excluding molecular oxygen by maintaining said gas blanket subjecting polymer containing at least some catalyst residue to the action of an alcohol at a temperature above 90° C. for a time sufficient to effect significant removal of catalyst.

11. Process of claim 10 wherein the total reaction mixture while under the protection of said inert gas blanket is treated with an alcohol at a temperature below 90° C., and the polymer is then separated from at least the bulk of the liquid while still under the protection of said inert gas blanket and thereafter is subjected to said action of an alcohol at a temperature above 90° C.

12. Process of claim 10 wherein the polymerization is effected in the presence of an inert liquid diluent, and the polymer is separated from at least the bulk of same while under the protection of said inert gas blanket and thereafter is subjected to said action of an alcohol at a temperature above 90° C.

13. Process of claim 12 wherein the polymer is polyethylene.

14. Process of claim 12 wherein the polymer is polypropylene.

15. In a process for the production of polyethylene by polymerizing ethylene in the presence of an inert liquid diluent and a catalyst prepared by the interaction of (a) an aluminum compound of the general formula $R_2AlX$ wherein R is selected from the group consisting of alkyl, cycloalkyl, and aryl radicals and X is selected from the group consisting of hydrogen, halogen, alkyl, cycloalkyl and aryl radicals, with (b) a metal halide selected from the group consisting of the chlorides, bromides and iodides of titanium and zirconium, the method of minimizing color formation in said polyethylene on thermal processing thereof which comprises completely protecting the total polymerization reaction mixture from any contact with molecular oxygen by blanketing same with an inert gas, and while still completely excluding molecular oxygen by maintaining said gas blanket separating the polyethylene from at least the bulk of the liquid and subjecting thus separated polyethylene containing at least some catalyst residue to the action of an alkyl alcohol containing from 1 to 8 carbon atoms at a temperature above 90° C. for a time sufficient to effect significant removal of catalyst.

16. In a process for the production of polymer by polymerizing an ethylenically unsaturated hydrocarbon monomer in the presence of an inert liquid diluent and a catalyst prepared by the interaction of (a) an aluminum compound of the general formula $R_2AlX$ wherein R is selected from the group consisting of alkyl, cycloalkyl and aryl radicals, and X is selected from the group consisting of hydrogen, halogen, alkyl, cycloalkyl and aryl radicals, with (b) a metal halide selected from the group consisting of the chlorides, bromides and iodides of titanium and zirconium, the method of minimizing color formation in said polymer on thermal processing thereof which comprises completely protecting the total polymerization reaction mixture from any contact with molecular oxygen by blanketing same with an inert gas, and while still completely excluding molecular oxygen by maintaining said gas blanket separating the polymer from at least the bulk of the liquid and subjecting thus separated polymer containing at least some catalyst residue to the action of an alkyl alcohol containing from 1 to 8 carbon atoms at a temperature above 90° C. for a time sufficient to effect significant removal of catalyst.

17. In a process for the production of polyethylene through the catalytic action of a catalyst prepared by the interaction of (a) an aluminum compound of the general formula $R_2AlX$ wherein R is selected from the group consisting of alkyl, cycloalkyl and aryl radicals, and X is selected from the group consisting of hydrogen, halogen, alkyl, cycloalkyl and aryl radicals, with (b) a metal halide selected from the group consisting of the chlorides, bromides and iodides of titanium and zirconium, on ethylene, the method of minimizing color formation in the polyethylene on thermal processing thereof which comprises treating said polyethylene while still containing at least some catalyst residue with an alcohol at a temperature above 90° C. while completely excluding molecular oxygen from contact with the polyethylene at all times prior thereto.

18. In a process for the protection of polymer through the catalytic action of a catalyst prepared by the interaction of (a) an aluminum compound of the general formula $R_2AlX$ wherein R is selected from the group consisting of alkyl, cycloalkyl and aryl radicals, and X is selected from the group consisting of hydrogen, halogen, alkyl, cycloalkyl and aryl radicals, with (b) a metal halide selected from the group consisting of the chlorides, bromides and iodides of titanium and zirconium, on an ethylenically unsaturated hydrocarbon monomer polymerizable thereby, the method of minimizing color formation in the polymer on thermal processing thereof which comprises treating said polymer while still containing at least some catalyst residue with an alcohol at a temperature above 90° C. while completely excluding molecular oxygen from contact with the polymer at all times prior thereto.

19. A method for treating polyethylene prepared with a catalyst formed by admixing a trialkylaluminum with titanium tetrachloride and containing catalyst residues after having been polymerized which comprises contacting the catalyst residue-containing polyethylene with a lower alkyl alcohol at a temperature of about 100° C. while completely excluding molecular oxygen from contact with the polyethylene at all times prior thereto.

20. A method for treating polyethylene prepared with a catalyst formed by admixing an organo-aluminum compound with titanium tetrachloride and containing catalyst residues after having been polymerized which comprises contacting the catalyst residue-containing polyethylene with a lower alkyl alcohol at a temperature of about 100° C. while completely excluding molecular oxygen from contact with the polyethylene at all times prior thereto.

References Cited

UNITED STATES PATENTS

| | | |
|---|---|---|
| 2,691,008 | 10/1954 | Grim _____ 260—93.5 |
| 2,658,059 | 11/1953 | Peters et al. |
| 2,666,756 | 1/1954 | Boyd et al. |
| 2,692,261 | 10/1954 | Peters et al. |
| 2,816,883 | 12/1957 | Larchar et al. |

FOREIGN PATENTS 533,362  5/1955  Belgium.

JOSEPH L. SCHOFER, *Primary Examiner.*

M. STERMAN, ALPHONSO D. SULLIVAN, W. H. SHORT, *Examiners.*

E. ROBERTS, R. WEXLER, J. T. BROWN, E. MOLSTEIN, F. L. DENSON, L. EDELMAN, *Assistant Examiners.*

UNITED STATES PATENT OFFICE
CERTIFICATE OF CORRECTION

Patent No. 3,377,331                                                                            April 9, 1968

Robert J. McManimie

It is certified that error appears in the above identified patent and that said Letters Patent are hereby corrected as shown below:

Column 5, line 69, "precessing" should read -- processing --. Column 6, line 8, "then" should read -- them --. Column 7, line 44, "or" should read -- of --. Column 15, line 29, before "in" insert -- placed --. Column 16, line 62, "isobuantol" should read -- isobutanol --. Column 17, line 36, after the comma insert -- on --. Column 18, line 75, "protection" should read -- production --.

Signed and sealed this 7th day of April 1970.

SEAL)

Attest:

Edward M. Fletcher, Jr.                                    WILLIAM E. SCHUYLER, JR.

Attesting Officer                                                         Commissioner of Patents